United States Patent
Yu et al.

(10) Patent No.: US 8,422,790 B2
(45) Date of Patent: Apr. 16, 2013

(54) IMAGE PROCESSING APPARATUS AND IMAGE PROCESSING METHOD

(75) Inventors: Shanshan Yu, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 13/064,297

(22) Filed: Mar. 16, 2011

(65) Prior Publication Data

US 2011/0229041 A1   Sep. 22, 2011

Related U.S. Application Data

(63) Continuation of application No. PCT/JP2008/066789, filed on Sep. 17, 2008.

(51) Int. Cl.
G06K 9/46    (2006.01)
G06K 9/66    (2006.01)

(52) U.S. Cl.
USPC .......................................................... 382/191

(58) Field of Classification Search .................. None
See application file for complete search history.

(56) References Cited

U.S. PATENT DOCUMENTS

| | | | |
|---|---|---|---|
| 6,829,384 B2 * | 12/2004 | Schneiderman et al. | 382/154 |
| 7,035,473 B1 * | 4/2006 | Zeng et al. | 382/251 |
| 2006/0193520 A1 | 8/2006 | Mita et al. | |
| 2006/0204103 A1 * | 9/2006 | Mita et al. | 382/190 |

FOREIGN PATENT DOCUMENTS

| | | |
|---|---|---|
| JP | 2001-298366 | 10/2001 |
| JP | 2003-069996 | 3/2003 |
| JP | 2006-268825 | 10/2006 |

OTHER PUBLICATIONS

Henry Schneiderman et al., "Object Detection Using the Statistics of Parts", International Journal of Computer Vision, 2002, 58 pages.
International Search Report for PCT/JP2008/066789, mailed Dec. 22, 2008.

* cited by examiner

*Primary Examiner* — Samir Ahmed
(74) *Attorney, Agent, or Firm* — Staas & Halsey LLP

(57) ABSTRACT

An image processing apparatus includes a conversion unit that converts an input image into a plurality of frequency components; a first quantization threshold calculating unit that calculates a first quantization threshold corresponding to a first frequency component among the plurality of frequency components of the input image converted by the conversion unit, based on a statistic value of the first frequency component; a second quantization threshold calculating unit that calculates a second quantization threshold corresponding to a second frequency component other than the first frequency component among the plurality of frequency components, based on the first quantization threshold calculated by the first quantization threshold calculating unit; and a quantization unit that quantizes the first frequency component and the second frequency component by using the first quantization threshold and the second quantization threshold, respectively.

9 Claims, 13 Drawing Sheets

FIG.3
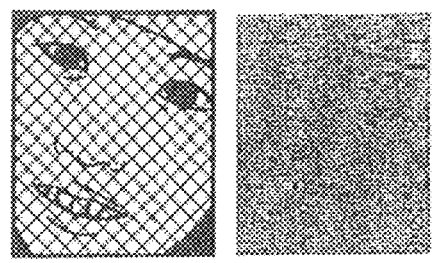
ORIGINAL IMAGE    WAVELET COEFFICIENTS
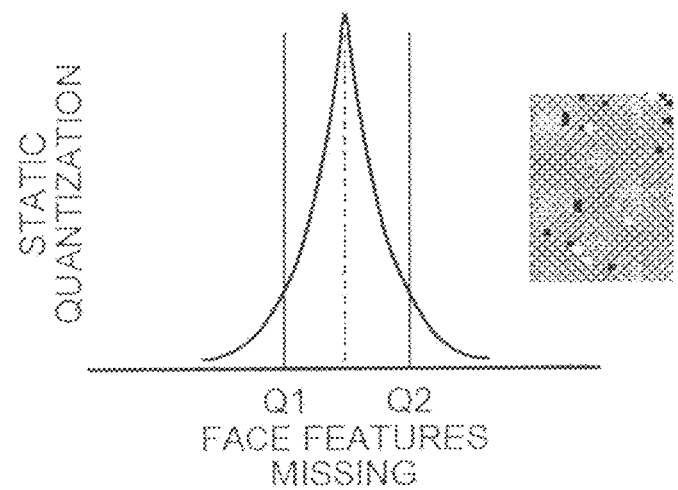
Q1    Q2
FACE FEATURES MISSING
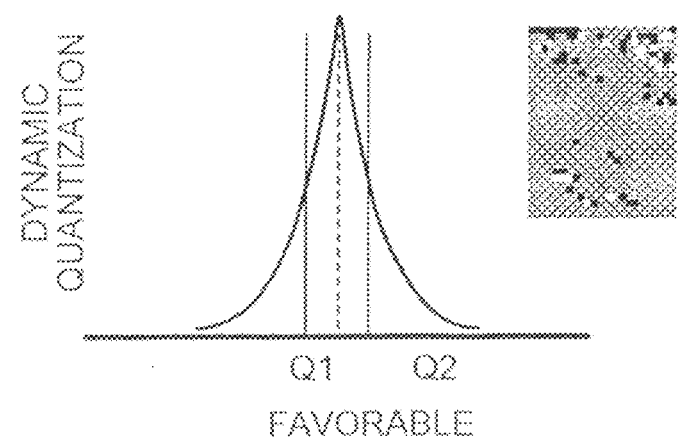
Q1    Q2
FAVORABLE
(a)

FIG.3
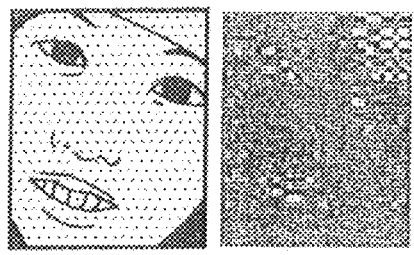
ORIGINAL IMAGE    WAVELET COEFFICIENTS
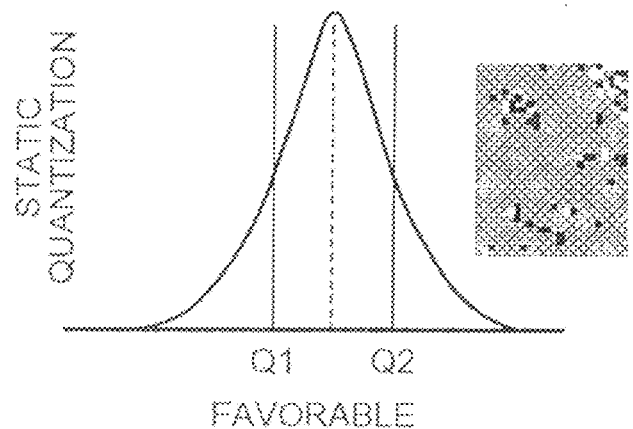
FAVORABLE
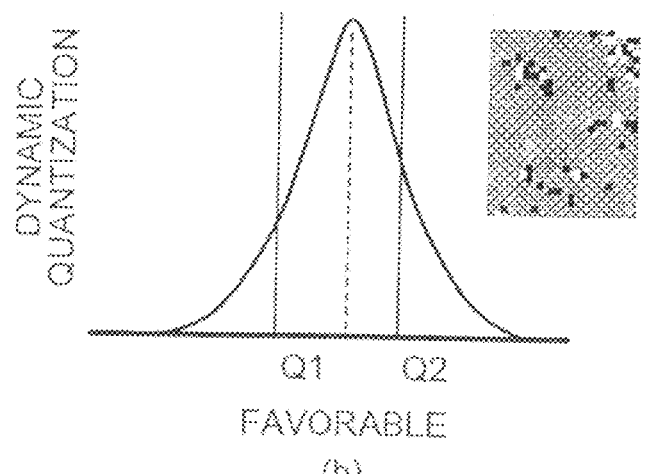
FAVORABLE
(b)

FIG.3
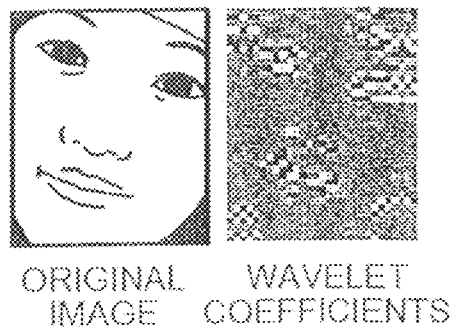
ORIGINAL IMAGE   WAVELET COEFFICIENTS
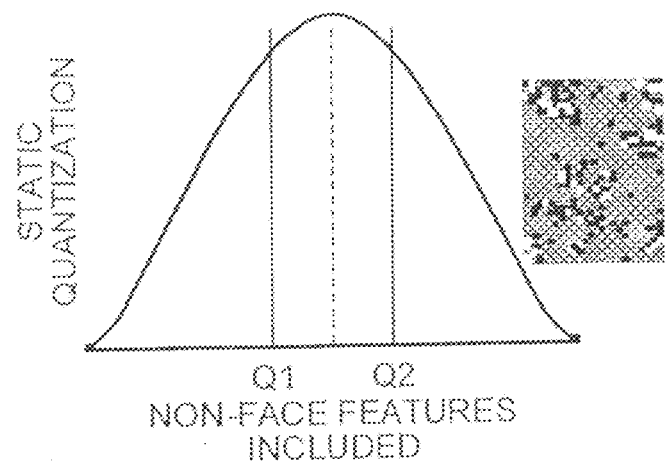
Q1   Q2
NON-FACE FEATURES INCLUDED
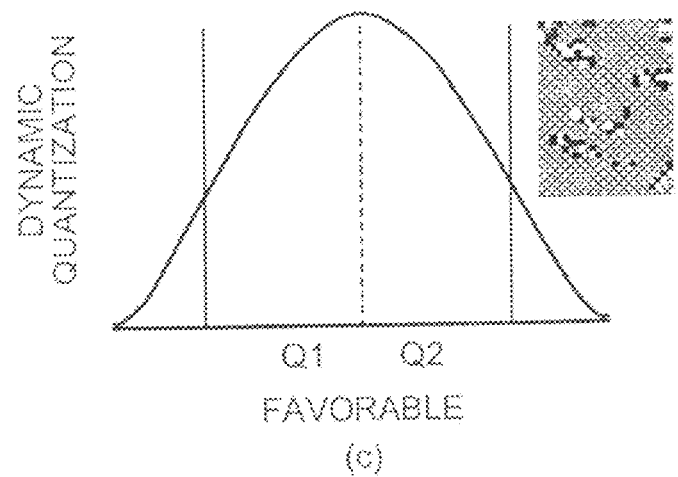
Q1   Q2
FAVORABLE
(c)

FIG.5
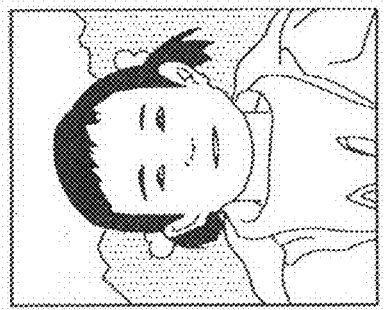
ORIGINAL IMAGE
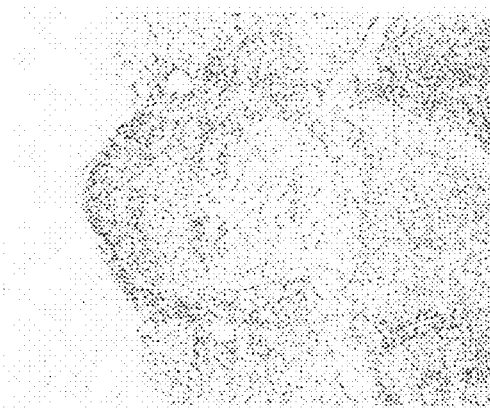
THIRD FREQUENCY COMPONENT
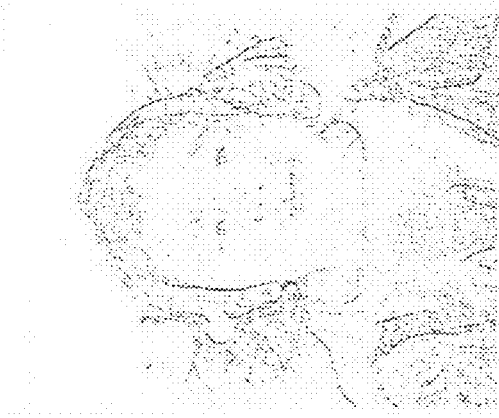
SECOND FREQUENCY COMPONENT
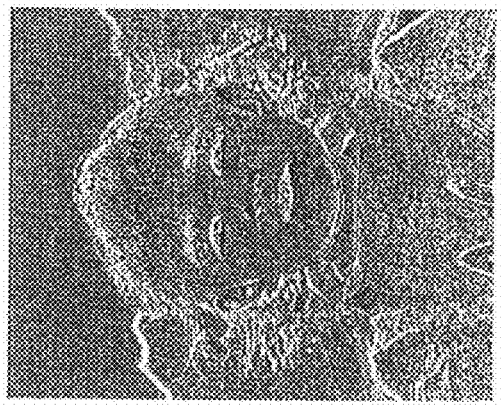
FIRST FREQUENCY COMPONENT

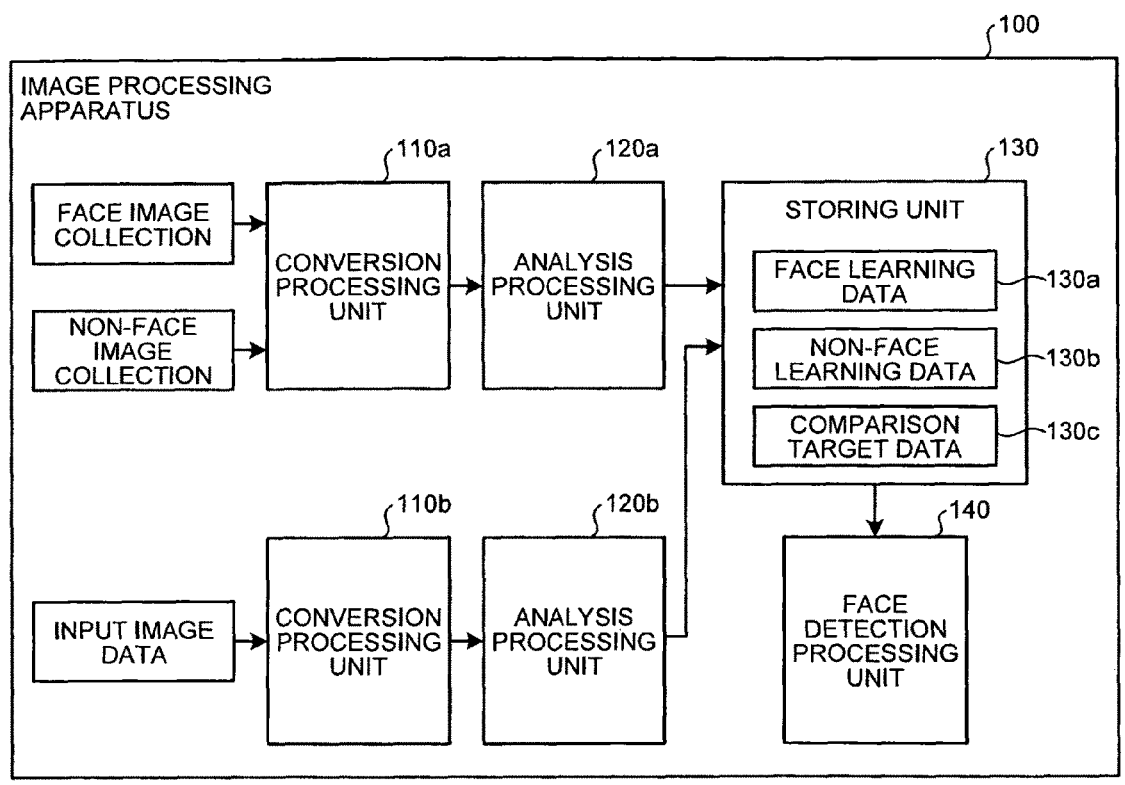

FIG.8

NON-FACE
LEARNING DATA
130b

| POSITION INFORMATION | CONVERSION COEFFICIENT VALUE |
|---|---|
| 1, 1 | 2 |
| 1, 2 | 0 |
| 1, 3 | 0 |
| ... | ... |

FIG.9

COMPARISON
TARGET DATA
130c

| POSITION INFORMATION | CONVERSION COEFFICIENT VALUE |
|---|---|
| 1, 1 | 1 |
| 1, 2 | 0 |
| 1, 3 | 2 |
| ... | ... |

COMPARISON RESULT TABLE

| AREA IDENTIFICATION INFORMATION | RESULT OF COMPARISON |
|---|---|
| 1001 | ○ |
| 1002 | ○ |
| 1003 | ○ |
| ... | ... |

130c
COMPARISON TARGET DATA

130a
FACE LEARNING DATA

130b
NON-FACE LEARNING DATA

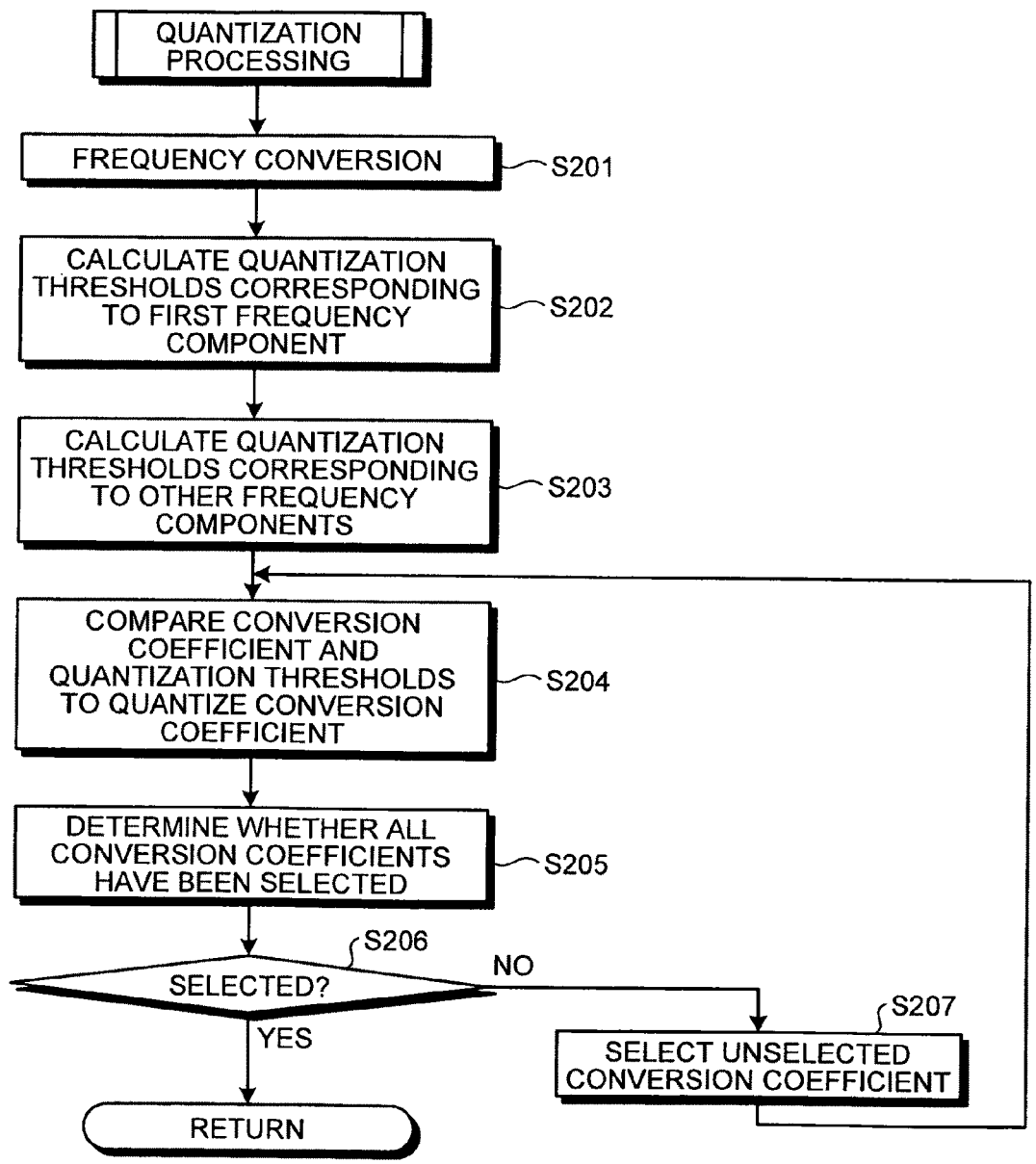

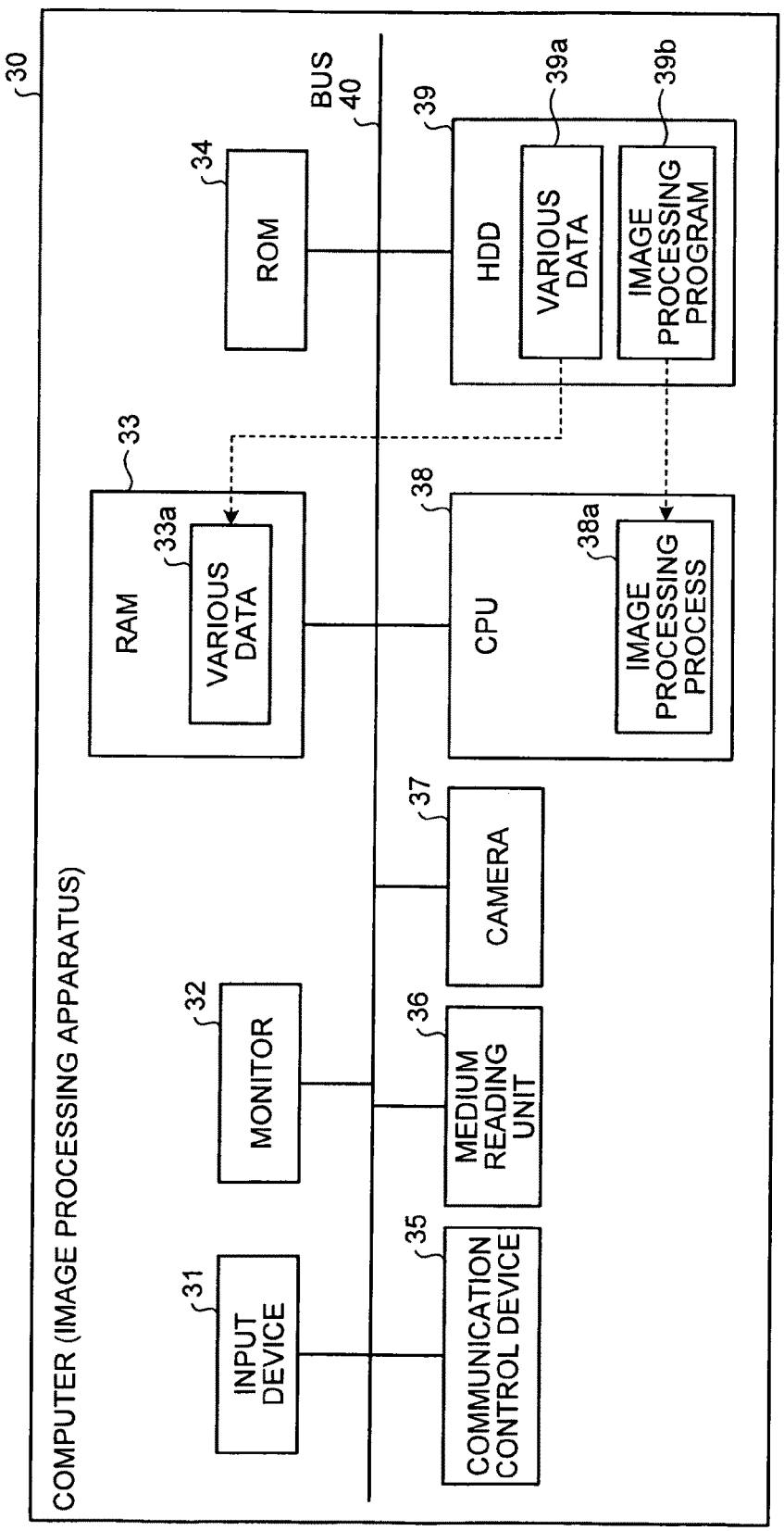

IMAGE PROCESSING APPARATUS AND IMAGE PROCESSING METHOD

CROSS-REFERENCE TO RELATED APPLICATION

This application is a continuation of International Application No. PCT/JP2008/066789, filed on Sep. 17, 2008, the entire contents of which are incorporated herein by reference.

FIELD

The embodiment discussed herein is directed to an image processing apparatus and an image processing method for quantizing image data.

BACKGROUND

In recent years, research has been made about object detection to detect various types of objects (such as a person's face and a car) from an image that is captured by a camera or the like. The object detection technology includes learning the features of objects to be detected to create learning data in advance, and comparing the created learning data and image data to determine whether the objects to be detected are included in the image.

The image data itself contains an enormous amount of information while the object detection technology has only to determine whether there is an object to be searched for in the image. The image data therefore needs to be reduced to save memory resources by utilizing information quantization techniques.

There are information quantization techniques in which the image data is subjected to frequency conversion (wavelet transform), and quantization processing is performed based on the magnitudes of the resulting conversion coefficients (or the magnitudes of differences in pixel value between adjoining pixels) (for example, see H. Schneiderman and T. Kanade, "Object Detection Using the Statistics of Parts", *International Journal of Computer Vision,* 2002, which is referred to as "Schneiderman" hereinafter). According to the quantization processing, the conversion coefficients and statically-set quantization thresholds are compared to quantize the image data in three levels. This can reduce the area for storing the image data and learning data intended for object detection.

In the technical field of image compression, there has been known a technology in which quantization steps for respective frequency components of the image are changed on the basis of differences (distortion) in pixel value between before and after image compression, thereby preventing the degradation of the image that is restored after quantization (for example, see Japanese Laid-open Patent Publication No. 2001-298366).

In the foregoing conventional techniques, the quantization processing is performed by comparing the conversion coefficients and statically-set quantization thresholds. It is therefore difficult to cope with the variety of images to be processed, and there has been the problem of a drop in the accuracy of object detection.

More specifically, the images to be subjected to object detection include various types of images such as bright, dim, and backlit ones. To perform accurate object detection on any type of image, it is desired to quantize the images while preserving the subjects' features necessary for object detection.

Like the known technology, there is a technique to avoid image degradation by changing quantization steps for the respective frequency components of an image on the basis of differences in pixel value between before and after image compression. Such a technique is not applicable to the object detection since the object detection involves no image compression.

SUMMARY

According to an aspect of an embodiment of the invention, an image processing apparatus includes a conversion unit that converts an input image into a plurality of frequency components; a first quantization threshold calculating unit that calculates a first quantization threshold corresponding to a first frequency component among the plurality of frequency components of the input image converted by the conversion unit, based on a statistic value of the first frequency component; a second quantization threshold calculating unit that calculates a second quantization threshold corresponding to a second frequency component other than the first frequency component among the plurality of frequency components, based on the first quantization threshold calculated by the first quantization threshold calculating unit; and a quantization unit that quantizes the first frequency component and the second frequency component by using the first quantization threshold and the second quantization threshold, respectively.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram for explaining a difference between the effects of dynamic quantization and static quantization;

FIG. 5 is a diagram for explaining a correlation between frequency components;

FIG. 6 is a functional block diagram illustrating the configuration of the image processing apparatus according to the present embodiment;

FIG. 7 is a chart illustrating an example of the data structure of face learning data;

FIG. 8 is a chart illustrating an example of the data structure of non-face learning data;

FIG. 9 is a chart illustrating an example of the data structure of comparison target data;

FIG. 14 is a flowchart illustrating the processing procedure of quantization processing; and FIG. 15 is a diagram illustrating the hardware configuration of a computer that constitutes the image processing apparatus according to the present embodiment.

DESCRIPTION OF EMBODIMENT

A preferred embodiment of the present invention will be explained with reference to accompanying drawings.

Before describing the content of the present invention, a description will be given of dynamic quantization processing that the inventor has devised as a previous step to the conception of the present invention. The following dynamic quantization processing is not a publicly known technology.

In the conventional quantization processing, image data has been subjected to frequency conversion before the conversion coefficients and statically-set quantization thresholds (thresholds previously set by the user) are compared to quantize the image data in three levels. On the other hand, according to the dynamic quantization devised by the inventor, histograms are calculated of the respective frequency components resulting from the frequency conversion of the image data, and the quantization thresholds are dynamically calculated on the basis of the histograms.

In the dynamic quantization processing, the dynamic calculation of the quantization thresholds according to the features of the image data allows optimum quantization of the image data. Such dynamic processing can be applied to object detection processing to save memory resources and improve the accuracy of the object detection.

Figure 1:
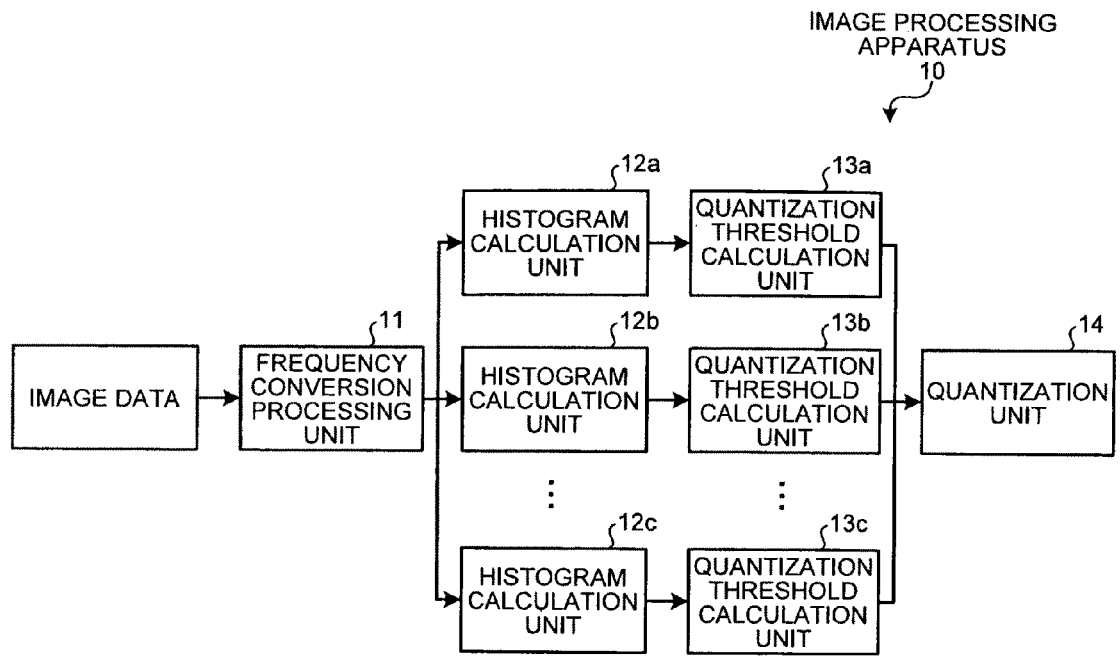
FIG. 1 is a functional block diagram illustrating the configuration of an image processing apparatus that performs dynamic quantization.

Next, the configuration of an image processing apparatus that performs the foregoing dynamic quantization will be described. FIG. 1 is a functional block diagram illustrating the configuration of an image processing apparatus 10 that performs the dynamic quantization. As illustrated in the diagram, the image processing apparatus 10 includes a frequency conversion processing unit 11, histogram calculation units 12a to 12c, quantization threshold calculation units 13a to 13c, and a quantization unit 14. While this example deals only with the histogram calculation units 12a to 12c and the quantization threshold calculation units 13a to 13c, the image processing apparatus 10 shall include other histogram calculation units and quantization threshold calculation units.

Of such components, the frequency conversion processing unit 11 is a processing unit that acquires image data and performs frequency conversion processing (for example, wavelet transform) on the acquired image data. The frequency conversion processing on the image data is the same as in known techniques. The frequency conversion processing unit 11 outputs the frequency-converted image data to the histogram calculation units 12a to 12c.

The histogram calculation units 12a to 12c are processing units that, when acquiring the frequency-converted image data from the frequency conversion processing unit 11, extract previously-set frequency components from the acquired image data and calculate histograms of conversion coefficients and frequencies corresponding to the extracted frequency components. By way of example, the following description will deal with a first frequency component, a second frequency component, and a third frequency component. Here, a first frequency>a second frequency>a third frequency.

Acquiring the frequency-converted image data from the frequency conversion processing unit 11, the histogram calculation unit 12a extracts the first frequency component from the acquired image data, and calculates a histogram that indicates the relationship between conversion coefficients and frequencies corresponding to the extracted first frequency component.

Acquiring the frequency-converted image data from the frequency conversion processing unit 11, the histogram calculation unit 12b extracts the second frequency component from the acquired image data, and calculates a histogram that indicates the relationship between conversion coefficients and frequencies corresponding to the extracted second frequency component.

Acquiring the frequency-converted image data from the frequency conversion processing unit 11, the histogram calculation unit 12c extracts the third frequency component from the acquired image data, and calculates a histogram that indicates the relationship between conversion coefficients and frequencies corresponding to the extracted third frequency component.

The quantization threshold calculation unit 13a is a processing unit that calculates quantization thresholds on the basis of the histogram calculated by the histogram calculation unit 12a. The quantization threshold calculation unit 13a outputs the calculated quantization thresholds Q1 and Q2 to the quantization unit 14.

Figure 2:
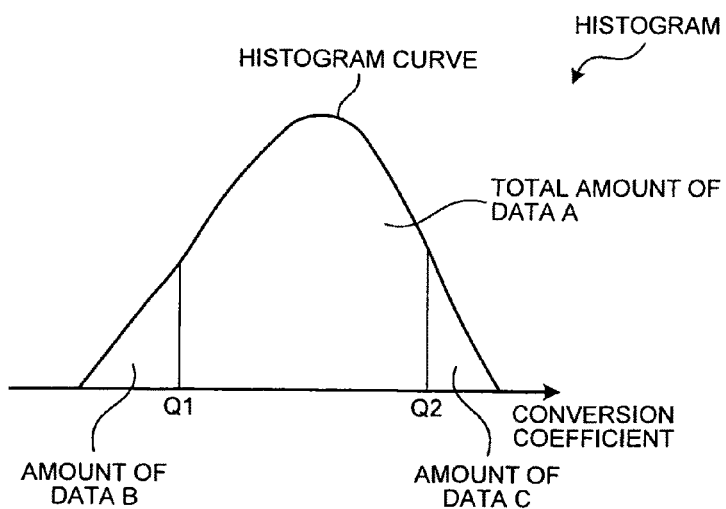
FIG. 2 is a diagram for explaining an example of the method of calculating quantization thresholds.

FIG. 2 is a diagram for explaining an example of the method of calculating quantization thresholds. For example, with predetermined preset values C1 and C2, the quantization threshold calculation unit 13a determines the total amount of data A included in the histogram (the amount of data included in the area between the histogram curve and the horizontal axis), and calculates the quantization threshold Q1 so that the amount of data B/the amount of data A is C1. The quantization threshold calculation unit 13a also calculates the quantization threshold Q2 so that the amount of data C/the amount of data A is C2.

Here, the amount of data B refers to the amount of data in the area that is surrounded by the histogram curve, the horizontal axis, and the vertical line from the quantization threshold Q1. The amount of data C refers to the amount of data in the area that is surrounded by the histogram curve, the horizontal axis, and the vertical line from the quantization threshold Q2. The quantization thresholds Q1 and Q2 shift back and forth depending on the shape of the histogram. That is, the quantization thresholds Q1 and Q2 are dynamically calculated according to various types of image data. It is therefore possible to cope with the variety of image data to be processed.

The quantization threshold calculation unit 13b is a processing unit that calculates quantization thresholds on the basis of the histogram calculated by the histogram calculation unit 12b. The quantization threshold calculation unit 13b outputs the calculated quantization thresholds Q1 and Q2 to the quantization unit 14. The quantization threshold calculation unit 13c is a processing unit that calculates quantization thresholds on the basis of the histogram calculated by the histogram calculation unit 12c. The quantization threshold calculation unit 13c outputs the calculated quantization thresholds Q1 and Q2 to the quantization unit 14. The processing of the quantization threshold calculation units 13b and 13c is the same as that of the quantization threshold calculation unit 13a.

The quantization unit 14 is a processing unit that quantizes the image data on the basis of the quantization thresholds acquired from the quantization threshold calculation units 13a to 13c. Specifically, the quantization unit 14 compares the quantization thresholds Q1 and Q2 acquired from the quantization threshold calculation unit 13a and the conversion coefficients of the first frequency component to quantize the image data in three levels. For example, the quantization unit 14 substitutes "0" for an area (block) of the image data where the conversion coefficient is smaller than the quantization threshold Q1. The quantization unit 14 substitutes "1" for an area where the conversion coefficient is greater than or equal to the quantization threshold Q1 and smaller than or equal to the quantization threshold Q2. The quantization unit 14 substitutes "2" for an area where the conversion efficient is greater than the quantization threshold Q2.

The quantization unit 14 also compares the quantization thresholds Q1 and Q2 acquired from the quantization threshold calculation unit 13b and the conversion coefficients of the second frequency component to quantize the image data in three levels. For example, the quantization unit 14 substitutes "0" for an area of the image data where the conversion coefficient is smaller than the quantization threshold Q1. The quantization unit 14 substitutes "1" for an area where the conversion coefficient is greater than or equal to the quantization threshold Q1 and smaller than or equal to the quantization threshold Q2. The quantization unit 14 substitutes "2" for an area where the conversion efficient is greater than the quantization threshold Q2.

The quantization unit 14 also compares the quantization thresholds Q1 and Q2 acquired from the quantization threshold calculation unit 13c and the conversion coefficients of the third frequency component to quantize the image data in three levels. For example, the quantization unit 14 substitutes "0" for an area of the image data where the conversion coefficient is smaller than the quantization threshold Q1. The quantization unit 14 substitutes "1" for an area where the conversion coefficient is greater than or equal to the quantization threshold Q1 and smaller than or equal to the quantization threshold Q2. The quantization unit 14 substitutes "2" for an area where the conversion efficient is greater than the quantization threshold Q2.

FIG. 3 is a diagram for explaining a difference between the effects of the dynamic quantization and static quantization. In FIGS. 3, (a) to (c) illustrate a difference between the dynamic quantization and static quantization when image data of different brightness is quantized. The image brightness is such that (a)<(b)<(c).

In FIG. 3(b), the image data can be favorably quantized by both the dynamic quantization and the static quantization. In FIG. 3(a), the image is so dim that the static quantization misses some of the features of the subject (such as a face), failing proper quantization. The dynamic quantization, on the other hand, can quantize the image data favorably.

In FIG. 3(c), the image is so bright that the static quantization includes features of objects other than the subject, failing proper quantization. The dynamic quantization, on the other hand, can quantize the image data favorably.

By the foregoing dynamic quantization, it is possible to cope with the variety of image data and appropriately quantize the image data. Since the quantization thresholds for each frequency component are calculated by calculating a histogram with respect to each frequency component, it is necessary to calculate all the histograms corresponding to the respective frequency components. There has thus been a problem with the speedup of the quantization processing.

Figure 4:
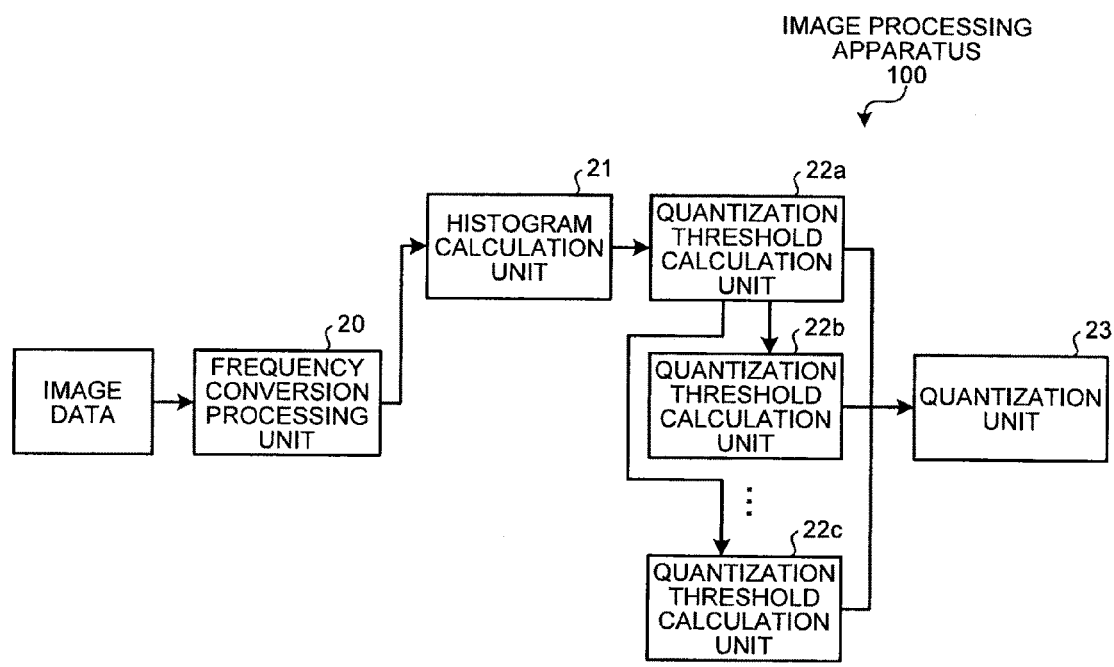
FIG. 4 is a diagram for explaining an outline of the image processing apparatus according to the present embodiment.

Next, an outline of the image processing apparatus according to the present embodiment will be described. FIG. 4 is a diagram for explaining the outline of an image processing apparatus 100 according to the present embodiment. As illustrated in FIG. 4, the image processing apparatus 100 includes a frequency conversion processing unit 20, a histogram calculation unit 21, quantization threshold calculation units 22a to 22c, and a quantization unit 23.

Of these, the frequency conversion processing unit 20 is a processing unit that acquires image data and performs frequency conversion processing (for example, wavelet transform) on the acquired image data. The frequency conversion processing on the image data is the same as in known techniques. The frequency conversion processing unit 20 outputs the frequency-converted image data to the histogram calculation unit 21.

The histogram calculation unit 21 is a processing unit that, when acquiring the frequency-converted image data from the frequency conversion processing unit 20, extracts a previously-set frequency component from the acquired image data and calculates a histogram of conversion coefficients and frequencies corresponding to the extracted frequency component. By way of example, the following description will deal with a first frequency component, a second frequency component, and a third frequency component. Here, a first frequency>a second frequency>a third frequency.

For example, the histogram calculation unit 21 is a processing unit that extracts the first frequency component and calculates a histogram that indicates the relationship between conversion coefficients and frequencies corresponding to the extracted frequency component. The histogram calculation unit 21 outputs information on the calculated histogram to the quantization threshold calculation unit 22a.

The quantization threshold calculation unit 22a is a processing unit that calculates quantization thresholds Q1 and Q2 corresponding to the first frequency component on the basis of the histogram calculated by the histogram calculation unit 21. The processing by which the quantization threshold calculation unit 22a calculates the quantization thresholds Q1 and Q2 is the same as that of the quantization threshold calculation unit 13a illustrated in FIG. 1. The quantization threshold calculation unit 22a outputs the quantization thresholds Q1 and Q2 corresponding to the first frequency component to the quantization threshold calculation units 22b and 22c and the quantization unit 23.

The quantization threshold calculation unit 22b is a processing unit that acquires the quantization thresholds Q1 and Q2 corresponding to the first frequency component from the quantization threshold calculation unit 22a, and calculates thresholds Q1 and Q2 corresponding to the second frequency component on the basis of the quantization thresholds acquired. The quantization threshold calculation unit 22b outputs the calculated quantization thresholds Q1 and Q2 corresponding to the second frequency component to the quantization unit 23.

Specifically, when calculating the quantization thresholds Q1 and Q2 corresponding to the second frequency component, the quantization threshold calculation unit 22b multiplies, for example, the quantization thresholds Q1 and Q2 corresponding to the first frequency component by n (n is an integer) to calculate the quantization thresholds Q1 and Q2 corresponding to the second frequency component.

The quantization threshold calculation unit 22c is a processing unit that acquires the quantization thresholds Q1 and Q2 corresponding to the first frequency component from the quantization threshold calculation unit 22a, and calculates thresholds Q1 and Q2 corresponding to the third frequency component on the basis of the quantization thresholds acquired. The quantization threshold calculation unit 22c outputs the calculated quantization thresholds Q1 and Q2 corresponding to the third frequency component to the quantization unit 23.

Specifically, when calculating the quantization thresholds Q1 and Q2 corresponding to the third frequency component, the quantization threshold calculation unit 22c multiplies, for example, the quantization thresholds Q1 and Q2 corresponding to the first frequency component by m (m is an integer greater than n) to calculate the quantization thresholds Q1 and Q2 corresponding to the third frequency component.

The quantization unit 23 is a processing unit that quantizes the image data on the basis of the quantization thresholds acquired from the quantization threshold calculation units 22a to 22c. The specific processing is the same as that of the quantization unit 14 illustrated in FIG. 1.

As described above, the image processing apparatus 100 according to the present embodiment converts the image data into a plurality of frequency components. The image processing apparatus 100 then calculates the quantization thresholds corresponding to a predetermined frequency component on the basis of the histogram (statistics) of the predetermined frequency component, omitting the processing to calculate the histograms of the other frequency components. The image processing apparatus 100 then calculates the quantization thresholds for the rest of the frequency components on the basis of the calculated quantization thresholds before quantizing the image data. This can speed up the quantization processing.

FIG. 5 is a diagram for explaining the correlation between the frequency components. Here, a horizontal high-frequency component resulting from the frequency conversion on the original image is used as the first frequency component. A vertical high-frequency component resulting from the frequency conversion on the original image is used as the second frequency component. A diagonal high-frequency component resulting from the frequency conversion on the original image is used as the third frequency component. As illustrated in FIG. 5, the frequency components of the image data are correlated with each other. The quantization thresholds corresponding to the respective frequency components can thus be calculated with high accuracy by the foregoing method even without calculating all the histograms corresponding to the frequency components.

Next, the configuration of the image processing apparatus according to the present embodiment will be described. FIG. 6 is a functional block diagram illustrating the configuration of the image processing apparatus 100 according to the present embodiment. As illustrated in FIG. 6, the image processing apparatus 100 includes conversion processing units 110a and 110b, analysis processing units 120a and 120b, a storing unit 130, and a face detection processing unit 140.

The conversion processing unit 110a is a processing unit that acquires face image collection data and non-face image collection data, and performs frequency conversion processing (for example, wavelet transform) on the face image collection data and non-face image collection data acquired. The conversion processing unit 110a corresponds to the frequency conversion processing unit 20 illustrated in FIG. 4.

Here, the face image collection data is image data on a collection of face images of various persons. The non-face image collection data is image data on a collection of various images other than face images. The face image collection data and the non-face image collection data shall have the same size. The image data included in the face image collection data is composed of a collection of images each corresponding a face in full size, covering most of the vertical length from the head to the chin and most of the horizontal width from ear to ear. It will be understood that since the learning data is intended for the detection of various faces, it may include not only data on facial shots from right in front, but also data on shots obliquely upward, downward, to the right, and to the left, data on faces with a hat or with glasses, and data on persons of all ages and genders. The non-face image collection data is composed of image data that includes no face.

The conversion processing unit 110a acquires the face image collection data and the non-face image collection data from an input device, a storage device (not illustrated), and the like. The conversion processing unit 110a outputs the frequency-converted face image collection data and non-face image collection data to the analysis processing unit 120a. In the following description, the frequency-converted face image collection data will be referred to as converted face image collection data. The frequency-converted non-face image collection data will be referred to as converted non-face image collection data.

The conversion processing unit 110b is a processing unit that acquires input image data and performs frequency conversion processing (for example, wavelet transform) on the input image data acquired. The conversion processing unit 110b corresponds to the frequency conversion processing unit 20 illustrated in FIG. 4. The input image data is image data to be subjected to object detection. The conversion processing unit 110b acquires the input image data from an input device, a storage device (not illustrated), and the like. The conversion processing unit 110b outputs the frequency-converted input image data to the analysis processing unit 120b.

The analysis processing unit 120a is a processing unit that, when acquiring the converted face image collection data and the converted non-face image collection data, quantizes the converted face image collection data to create face learning data and quantizes the converted non-face image collection data to create non-face learning data.

The processing by which the analysis processing unit 120a quantizes the converted face image collection data to create the face learning data is the same as that of the histogram calculation unit 21, the quantization threshold calculation units 22a to 22c, and the quantization unit 23 illustrated in FIG. 4. The analysis processing unit 120a outputs the created face learning data to the storing unit 130.

The processing by which the analysis processing unit 120a quantizes the converted non-face image collection data to create the non-face learning data is the same as that of the histogram calculation unit 21, the quantization threshold calculation units 22a to 22c, and the quantization unit 23 illustrated in FIG. 4. The analysis processing unit 120a outputs the created non-face learning data to the storing unit 130.

The analysis processing unit 120b is a processing unit that, when acquiring the frequency-converted input image data, quantizes the acquired input image data in three levels. It should be noted that the input image data refers to an image that is clipped out of the object of face detection processing (the input frame itself). Such an image corresponds to the comparison target data. Since it is unknown what size of face the whole frame intended for face detection includes, the area of the comparative target data is set by changing the comparison target data into a plurality of sizes and shifting the clipping position in the frame for clipping. The processing by which the analysis processing unit 120b acquires the input image data and creates the comparison target data is the same as that of the histogram calculation unit 21, the quantization threshold calculation units 22a to 22c, and the quantization unit 23 illustrated in FIG. 4.

The storing unit 130 is a storing unit that stores face learning data 130a and non-face learning data 130b which are output from the analysis processing unit 120a, and comparison target data 130c which is output from the analysis processing unit 120b.

FIG. 7 is a chart illustrating an example of the data structure of the face learning data 130a. As illustrated in FIG. 7, the face learning data 130a contains position information and conversion coefficient values (quantized values) in association with each other. It should be noted that the data structure of the face learning data 130a is not limited to the one illustrated in FIG. 7. For example, conversion coefficient values may be stored in association with respective blocks of conversion coefficients (for example, eight coefficients) to be compared for object detection.

FIG. 8 is a chart illustrating an example of the data structure of the non-face learning data 130b. As illustrated in FIG. 8, the non-face learning data 130b contains position information and conversion coefficient values (quantized values; in the chart, written as numerical information) in association with each other. It should be noted that the data structure of the non-face learning data 130b is not limited to the one illustrated in FIG. 8. For example, conversion coefficient values may be stored in association with respective blocks of conversion coefficients (for example, eight coefficients) to be compared for object detection.

FIG. 9 is a chart illustrating an example of the data structure of the comparison target data 130c. As illustrated in the diagram, the comparison target data 130c contains position information and conversion coefficient values (quantized values; in the chart, written as numerical information) in association with each other. It should be noted that the data structure of the comparison target data 130c is not limited to the one illustrated in FIG. 9. For example, conversion coefficient values may be stored in association with respective blocks of conversion coefficients (for example, eight conversion coefficients) to be compared for object detection.

The face detection processing unit 140 is a processing unit that compares the face learning data 130a, the non-face learning data 130b, and the comparison target data 130c stored in the storing unit 130 to determine whether the input image data contains a face image. The face detection processing unit 140 outputs the determination result to a host processing unit (not illustrated).

Figure 10:
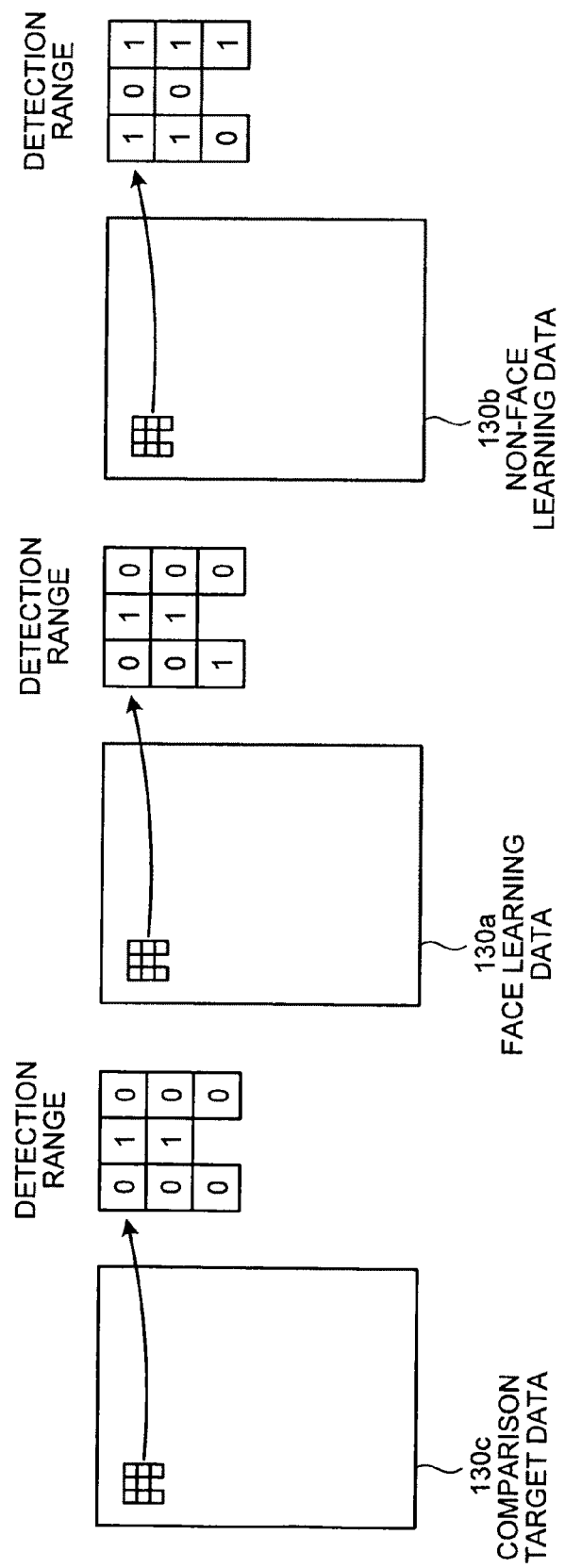
FIG. 10 is a diagram for explaining an example of the processing of a face detection processing unit.

FIG. 10 is a diagram for explaining an example of the processing of the face detection processing unit 140. Specifically, the face detection processing unit 140 sets a detection range, and compares conversion coefficient values included in the detection ranges at the same positions of the face learning data 130a, the non-face learning data 130b, and the comparison target data 130c. The face detection processing unit 140 then determines from the comparison result whether the detection range of the comparison target data is similar to that of the face learning data or that of the non-face learning data, and registers the result of determination in a comparison result table. Such a comparison result table shall be retained by the face detection processing unit 140.

FIG. 10 is a chart illustrating an example of the data structure of the comparison result table. As illustrated in FIG. 10, the comparison result table contains detection range identification information, which identifies the detection range, and comparison results in association with each other. If the comparison between the detection ranges of the face learning data 130a, the non-face learning data 130b, and the comparison target data 130c results in the determination that the comparison target data 130c is similar to the face learning data 130a, the face detection processing unit 140 registers a "circle" in the comparison result. If the comparison target data 130c is determined to be similar to the non-face learning data 130b, the face detection processing unit 140 registers a "cross" in the comparison result.

A specific description will be given with reference to FIG. 10. For example, suppose that the detection range identification information on the detection ranges currently set for the respective pieces of image data 130a to 130c is "1001". The face detection processing unit 140 compares the conversion coefficient values in the detection range of the comparison target data 130c with those in the detection range of the face learning data 130a, and finds eight hits.

Meanwhile, the face detection processing unit 140 compares the conversion coefficient values in the detection range of the comparison target data 130c with those in the detection range of the non-face learning data 130b, and finds one hit. In such a case, since the number of hits with the face learning data 130a is greater than with the non-face learning data 130b, the face detection processing unit 140 sets a "circle" in the comparison result corresponding to the detection range identification information "1001." On the other hand, if the number of hits with the non-face learning data 130b is greater, the face detection processing unit 140 sets a "cross." If the numbers of hits are the same, neither will be set.

Figures 11, 12:
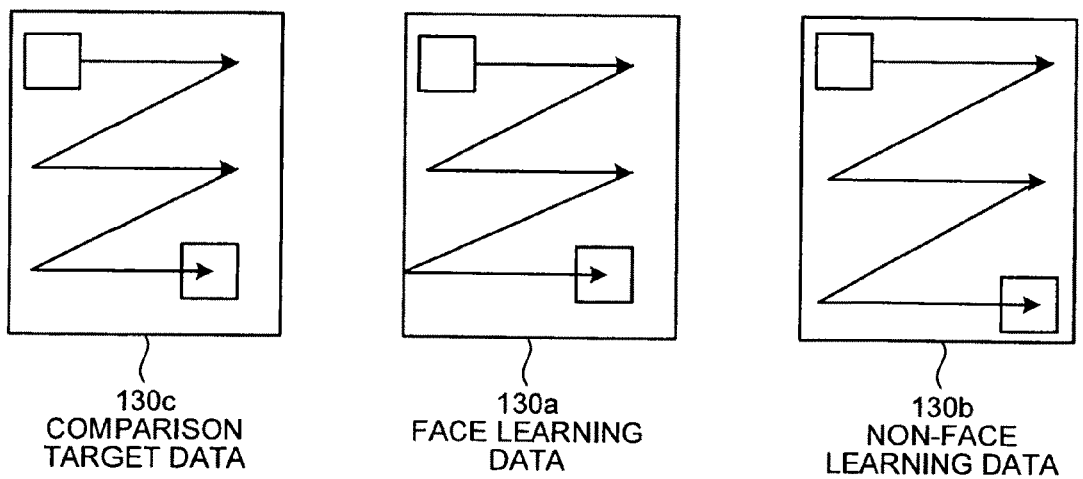
FIG. 11 is a chart illustrating an example of the data structure of a comparison result table.
FIG. 12 is a diagram for explaining how the detection range moves.

The face detection processing unit 140 moves the detection range as illustrated in FIG. 12 and registers a "circle" or "cross" into the comparison result of the comparison result table in succession. FIG. 12 is a diagram for explaining how the detection ranges move. When comparing the conversion coefficient values in the detection ranges, the face detection processing unit 140 locates the detection ranges in the same positions on the face learning data 130a, the non-face learning data 130b, and the comparison target data 130c.

After the end of the comparison between the comparison target data 130c, the face learning data 130a, and the non-face learning data 130b, the face detection processing unit 140 consults the comparison result table. If the number of "circles" is greater than that of "crosses", the face detection processing unit 140 determines that the input image includes a face image. On the other hand, if the number of "circles" is smaller than that of "crosses", the face detection processing unit 140 determines that the input image includes no face image. If the number of "circles" and that of "crosses" are the same, the face detection processing unit 140 may determine either that a face image is included or not, depending on the administrator's setting.

While FIG. 10 illustrates the case where the face detection processing unit 140 compares the conversion coefficient values in units of eight blocks, this is not restrictive. For example, conversion coefficient values may be compared in units of n conversion coefficients (n is a natural number). The comparison results need not necessarily be saved with respect to each detection range as illustrated in FIG. 11. For example, the numbers of "circles" and "crosses" may be summarized and only the result of the summary may be saved in the comparison result table.

Figure 13:
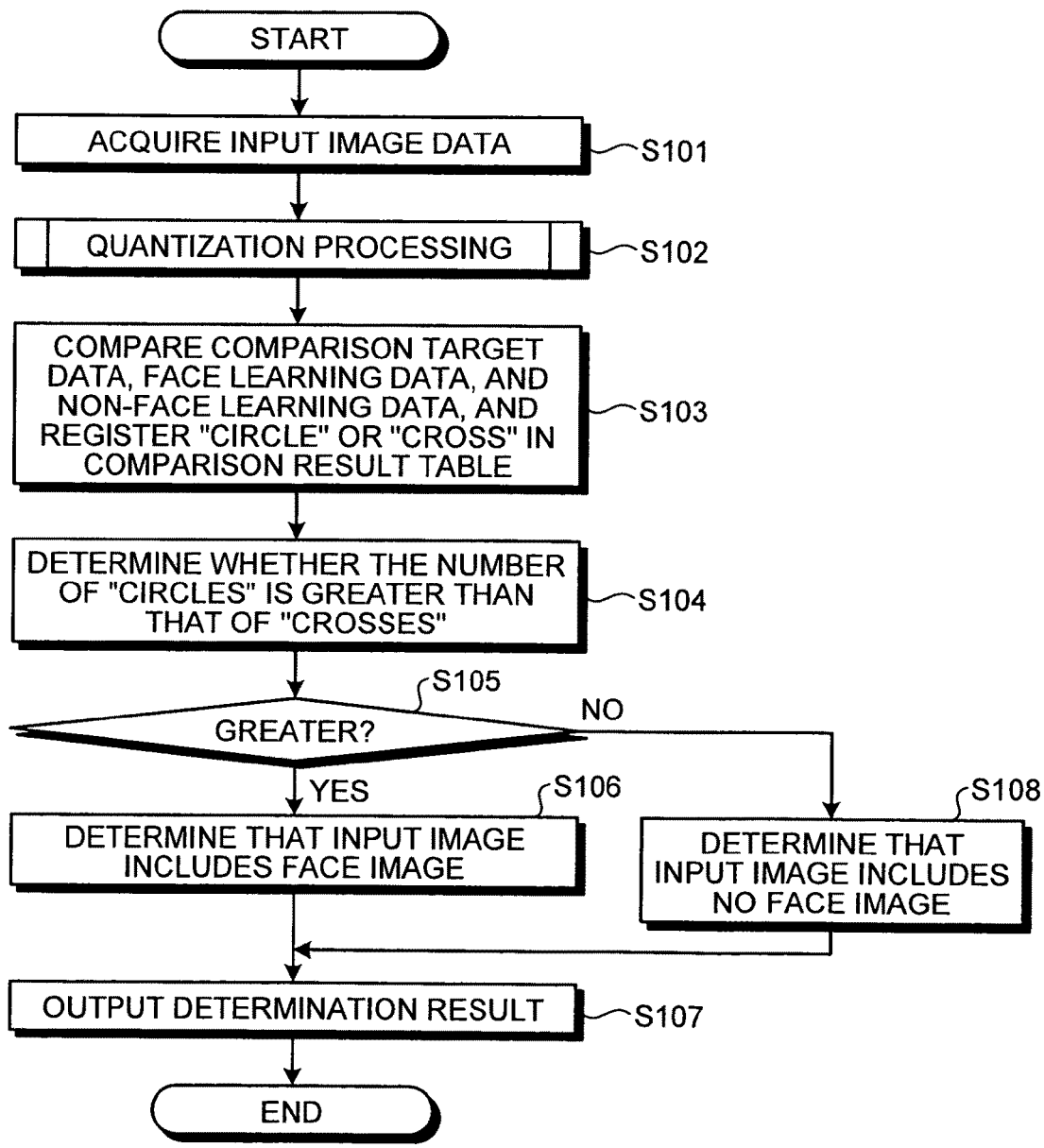
FIG. 13 is a flowchart illustrating the processing procedure of the image processing apparatus according to the present embodiment.

Next, the processing procedure of the image processing apparatus 100 according to the present embodiment will be described. FIG. 13 is a flowchart illustrating the processing procedure of the image processing apparatus 100 according to the present embodiment. As illustrated in FIG. 13, the image processing apparatus 100 acquires input image data (step S101), and performs the quantization processing (step S102).

The image processing apparatus 100 then compares the comparison target data 130c, the face learning data 130a, and the non-face learning data 130b and registers "circles" or "crosses" in the comparison result table (step S103), and determines whether "circles" are more than "crosses" (step S104).

If "circles" are more than "crosses" (step S105, Yes), the image processing apparatus 100 determines that the input image includes a face image (step S106), and outputs the determination result (step S107). If "circles" are fewer than "crosses" (step S105, No), the image processing apparatus 100 determines that the input image includes no face image (step S108), and moves to step S107.

Next, the processing procedure of the quantization processing illustrated in step S102 of FIG. 13 will be described. FIG. 14 is a flowchart illustrating the processing procedure of the quantization processing. As illustrated in FIG. 14, the image processing apparatus 100 performs frequency conversion on the input image data (step S201), and calculates the quantization thresholds corresponding to the first frequency component (step S202).

Based on the quantization thresholds corresponding to the first frequency components, the image processing apparatus 100 calculates the quantization thresholds corresponding to the other frequency components (step S203).

The image processing apparatus 100 compares the conversion coefficient corresponding to a selected block with the quantization thresholds Q1 and Q2 to quantize the conversion coefficient (step S204), and determines whether all the blocks (areas) have been selected (step S205).

If all the conversion coefficients have been selected (step S206, Yes), the image processing apparatus 100 ends the quantization processing. On the other hand, if all the conversion coefficients have not been selected (step S206, No), the image processing apparatus 100 selects an unselected conversion coefficient (step S207) and moves to step S204. As mentioned previously, it is unknown what size of face the input frame intended for face detection includes. The area of the comparison target data is thus set by changing the comparison target data (input image) into a plurality of sizes and performing clipping while shifting the clipping position in the input frame in a scanning manner. For example, an area of comparison target data of first size is clipped out of the input frame intended for face detection, and the area of the comparison target data is set so that the area of the comparison target data scans inside the frame. After the end of the scanning with the first size of comparison target data, the size of the comparison target data is changed to a second size. An area of comparison target data of the second size is clipped out, and the area of comparison target data is set to scan inside the frame. The number of sizes of the comparison target data may be set arbitrarily. The threshold setting and quantization processing illustrated in FIG. 14 is performed each time the size of the comparison target data and the clipping position in the input frame intended for face detection are changed.

As has been described above, the image processing apparatus 100 according to the present embodiment converts the image data into a plurality of frequency components. The image processing apparatus 100 then calculates the quantization thresholds corresponding to a predetermined frequency component on the basis of the histogram (statistics) of the predetermined frequency component, omitting the processing to calculate the histograms of the other frequency components. The image processing apparatus 100 then calculates the quantization thresholds for the rest of the frequency components on the basis of the calculated quantization thresholds before quantizing the image data. This can speed up the quantization processing. The dynamic calculation of the quantization thresholds can improve the accuracy of the processing for object detection.

Note that the image processing apparatus 100 according to the present embodiment calculates the quantization thresholds for the first frequency component among the frequency components of the frequency-converted image data, and on the basis of the calculated quantization thresholds, calculates the quantization thresholds corresponding to the other frequency components.

For the first frequency component, the image processing apparatus 100 desirably selects a component that contains features of the object to be detected, a face. For example, horizontal information on a face (such as eyes and a mouth) contains a greater amount of features of face information than vertical information (nose) does. The image processing apparatus 100 therefore selects conversion coefficients (horizontal high-frequency component) of the image data containing horizontal information. The foregoing dynamic quantization method described in the present embodiment can be effectively practiced in combination with publicly-known face detection techniques. For example, the dynamic quantization method may be combined with Schneiderman. Schneiderman uses a face image dictionary and a non-face image dictionary on the basis of wavelet transform coefficients, and can thus be put into operation simply by replacing the quantization processing alone. The horizontal high-frequency component mentioned above may also be used effectively. The foregoing embodiment has dealt with the configuration where the creation of the dictionary data and the detection processing are integrated with each other. Embodiments are not limited to such an integrated one, and may be configured so that the section that performs up to the creation of the dictionary data and the section that performs the detection processing are separated from each other. In such a configuration, the dictionary data created is retained in the device that performs the detection processing.

All or part of processes that have been described in the present embodiment as being automatically performed may be performed manually. All or part of processes that have been described as being manually performed may be automatically performed by publicly known methods. Moreover, the processing procedures, control procedures, specific names, and information including various data and parameters that have been described above or illustrated in the drawings may be arbitrarily modified unless otherwise specified.

The components of the image processing apparatus 100 illustrated in FIG. 6 are functionally conceptual ones and need not necessarily have the illustrated physical configuration. The various types of processing procedures described in the present embodiment may be implemented by running a prepared program on a computer such as a personal computer and a workstation.

FIG. 15 is a diagram illustrating the hardware configuration of a computer that constitutes the image processing apparatus 100 according to the present embodiment. As illustrated in FIG. 15, the computer (image processing apparatus) 30 includes an input device 31, a monitor 32, a RAM (random access memory) 33, a ROM (read only memory) 34, a communication control device 35 which performs communication with other devices over a network, a medium reading unit 36 which reads data from a storing medium, a camera 37, a CPU (central processing unit) 38, and a HDD (hard disk drive) 39. Such components are connected with a bus 40.

The HDD 39 contains an image processing program 39b which provides the same functions as those of the image processing apparatus 100 described above. The CPU 38 reads and executes the image processing program 39b, whereby an image processing process 38a is activated.

Here, the image processing process 38a corresponds to the conversion processing units 110a and 110b, the analysis processing units 120a and 120b, and the face detection processing unit 140 of FIG. 6. The HDD 39 contains various data 39a corresponding to the information stored in the storing unit 130 of the image processing apparatus 100. The CPU 38 reads the various data 39a stored in the HDD 39, stores the data into the RAM 33, and performs the image data quantization and object detection by using various data 33a stored in the RAM 33.

It should be noted that the image processing program 39b illustrated in FIG. 15 need not necessarily be stored in the HDD 39 from the beginning. For example, the image processing program 39b may previously be stored in a "portable physical medium" such as a flexible disk (FD), CD-ROM, DVD disc, magneto-optical disc, and IC card to be inserted into the computer, a "stationary physical medium" such as a hard disk drive (HDD) which is provided inside or outside the computer, or "another computer (or server)" which is connected to the computer through a public circuit, the Internet, LAN, WAN, or the like. The computer may read the image processing program 39b from such a medium for execution.

According to an aspect of the image processing apparatus, the quantization threshold calculated for the first frequency component, which indicates a feature of the image, can be utilized to calculate the quantization thresholds of the other frequency components. This can simplify the calculation of the quantization thresholds of the remaining frequency components for processing speedup.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing apparatus comprising:
    a conversion unit that converts an input image into a plurality of frequency components;
    a first quantization threshold calculating unit that calculates a first quantization threshold corresponding to a first frequency component among the plurality of frequency components of the input image converted by the conversion unit, based on a statistic value of the first frequency component;
    a second quantization threshold calculating unit that calculates a second quantization threshold corresponding to a second frequency component other than the first frequency component among the plurality of frequency components, based on the first quantization threshold calculated by the first quantization threshold calculating unit; and
    a quantization unit that quantizes the first frequency component and the second frequency component by using the first quantization threshold and the second quantization threshold, respectively, wherein
    the conversion unit converts a detection target image for a subject to be detected from and a dictionary image into a plurality of frequency components, the dictionary image being intended for use when determining whether the subject is included in the detection target image,
    the first quantization threshold calculating unit calculates both a first quantization threshold of the detection target image and a first quantization threshold of the dictionary image,
    the second quantization threshold calculating unit calculates both a second quantization threshold of the detection target image and a second quantization threshold of the dictionary image, and
    the quantization unit quantizes the detection target image based on the first quantization threshold and the second quantization threshold of the detection target image, and quantizes the dictionary image based on the first quantization threshold and the second quantization threshold of the dictionary image.

2. The image processing apparatus according to claim 1, wherein
    the conversion unit converts a detection target image for a subject to be detected from and a dictionary image into a plurality of frequency components, the dictionary image being intended for use when determining whether the subject is included in the detection target image,
    the first quantization threshold calculating unit calculates both a first quantization threshold of the detection target image and a first quantization threshold of the dictionary image,
    the second quantization threshold calculating unit calculates both a second quantization threshold of the detection target image and a second quantization threshold of the dictionary image,
    the quantization unit quantizes the detection target image based on the first quantization threshold and the second quantization threshold of the detection target image, and quantizes the dictionary image based on the first quantization threshold and the second quantization threshold of the dictionary image, and
    the image processing apparatus further comprises a determination unit that compares the detection target image quantized by the quantization unit and the dictionary image quantized by the quantization unit to determine whether the subject is included in the detection target image.

3. The image processing apparatus according to claim 1, wherein the first frequency component is a horizontal high-frequency component of the input image.

4. An image processing method performed in an image processing apparatus, comprising:
    converting an input image into a plurality of frequency components;
    first calculating a first quantization threshold corresponding to a first frequency component among the plurality of frequency components of the input image converted at the converting, based on a statistic value of the first frequency component;
    second calculating a second quantization threshold corresponding to a second frequency component other than the first frequency component among the plurality of frequency components, based on the calculated first quantization threshold; and
    quantizing the first frequency component and the second frequency component by using the first quantization threshold and the second quantization threshold, respectively, wherein
    the converting includes converting a detection target image for a subject to be detected from and a dictionary image into a plurality of frequency components, the dictionary image being intended for use when determining whether the subject is included in the detection target image, the first calculating includes calculating both a first quantization threshold of the detection target image and a first quantization threshold of the dictionary image, the second calculating includes calculating both a second quantization threshold of the detection target image and a second quantization threshold of the dictionary image, and the quantizing includes quantizing the detection target image based on the first quantization threshold and the second quantization threshold of the detection target image, and quantizes the dictionary image based on the first quantization threshold and the second quantization threshold of the dictionary image.

5. The image processing method according to claim 4, wherein the image processing method further comprises comparing the quantized detection target image and the quantized dictionary image to determine whether the subject is included in the detection target image.

6. The image processing method according to claim 4, wherein the first frequency component is a horizontal high-frequency component of the input image.

7. A computer-readable, non-transitory medium storing a program causing a computer to execute a process comprising:
converting an input image into a plurality of frequency components;
first calculating a first quantization threshold corresponding to a first frequency component among the plurality of frequency components of the input image converted at the converting, based on a statistic value of the first frequency component;
second calculating a second quantization threshold corresponding to a second frequency component other than the first frequency component among the plurality of frequency components, based on the calculated first quantization threshold; and
quantizing the first frequency component and the second frequency component by using the first quantization threshold and the second quantization threshold, respectively, wherein the converting includes converting a detection target image for a subject to be detected from and a dictionary image into a plurality of frequency components, the dictionary image being intended for use when determining whether the subject is included in the detection target image, the first calculating includes calculating both a first quantization threshold of the detection target image and a first quantization threshold of the dictionary image, the second calculating includes calculating both a second quantization threshold of the detection target image and a second quantization threshold of the dictionary image, and the quantizing includes quantizing the detection target image based on the first quantization threshold and the second quantization threshold of the detection target image, and quantizes the dictionary image based on the first quantization threshold and the second quantization threshold of the dictionary image.

8. The computer-readable, non-transitory medium according to claim 7, wherein the process further comprises comparing the quantized detection target image and the quantized dictionary image to determine whether the subject is included in the detection target image.

9. The computer-readable, non-transitory medium according to claim 7, wherein the first frequency component is a horizontal high-frequency component of the input image.

* * * * *